United States Patent [19]

Yaggy

[11] 4,101,931

[45] Jul. 18, 1978

[54] SILICON DIODE ARRAY VIDICON WITH ELECTRONICALLY CONTROLLED SENSITIVITY

[75] Inventor: Leon S. Yaggy, Oceanside, Calif.

[73] Assignee: Hughes Aircraft Company, Culver City, Calif.

[21] Appl. No.: 736,790

[22] Filed: Oct. 29, 1976

[51] Int. Cl.[2] ........ H04N 5/36

[52] U.S. Cl. ........ 358/217

[58] Field of Search ........ 315/10; 357/31; 313/367, 368; 358/213, 223, 217

[56] References Cited

U.S. PATENT DOCUMENTS 2,531,508 11/1950 Goldsmith ........ 358/223

FOREIGN PATENT DOCUMENTS 1,905,015 2/1969 Fed. Rep. of Germany ....... 358/223

*Primary Examiner*—Maynard R. Wilbur

*Assistant Examiner*—T. M. Blum

[57] ABSTRACT

Silicon diode array target sensitivity is made adjustable over a wide range by retracing the reading electron beam in the erase mode for each line, a variable number of scan periods ahead of its being read.

11 Claims, 8 Drawing Figures

SILICON DIODE ARRAY VIDICON WITH ELECTRONICALLY CONTROLLED SENSITIVITY

BACKGROUND OF THE INVENTION

The present invention relates generally to image transducing devices of the type wherein the image is stored as a charge pattern in a semiconducting target element having an array of diodes in one of its faces which is swept by an electron beam, and more particularly to a vidicon camera tube using such a target element.

The target element of the above type is basically comprised of a wafer of semiconducting material doped to have an N-type conductivity, with one of the major faces of the wafer being selectively doped to have a large plurality of P conductivity type regions, respective ones of the regions forming a junction diode with the substrate thereunder. The substrate is maintained at a potential which is positive with respect to the scanning electron beam so that, as the P conductivity type regions are bombarded with electrons they become reverse biased. In the reverse biased state each of the junction diodes stores an electric charge, electrons, derived from the beam and maintains that charge at least until it is scanned again. The customary scanning frequency is 30 hertz, making the time between successive scans 1/30 second.

The opposite face of the target element receives light from an image, and photons thus striking the target cause electron-hole pairs to be generated in the substrate of the target. A substantial number of the holes thus generated reach the diodes opposite the point of photon impact, where they combine with and hence eliminate a corresponding number of stored electrons. A charge pattern is thus created in the array of diodes, corresponding to the image striking the opposite face of the target element, with each diode having its stored charge diminished by an amount corresponding to the time integral of the light striking the corresponding spot on the light-receiving side of the target element. Consequently, upon its next scan, the electron beam charges each diode by an amount corresponding to the charge lost by that diode since it was last scanned, i.e., during the last 1/30 second. The amount of charging current from the electron beam and, more specifically, the photon-generated charges integrated by the target during each scan cycle, are detected by circuitry associated with the target to provide a signal representative of the detected image.

One limitation of existing vidicons of the above type is that, unlike earlier vidicons having an $Sb_2S_3$ target, the sensitivity or gain of the silicon diode array vidicon cannot be varied by means of the applied target voltage. The reason for this is that the ratio of electronic charges in the output to abosorbed photons at the input is independent of target voltage over its useful range. In short, regardless of what the target voltage is within its useful range, diodes lose their charge at the same rate for an impinging image of given brightness. This places a limit on just how bright an image the devices can detect, since each diode can receive and store only a finite amount of charge from the scanning electron beam. If any point in the image is bright enough to deplete of its charge the diode at which it is projected, and to do so before the diode is scanned again by the electron beam, that point in the image will not be faithfully represented. Thus, silicon vidicon junction diode targets impose a severe limit on available dynamic range.

In order to prevent the dynamic range of the tube from being exceeded, it has been necessary to control the number of photons reaching the target by means of filters, or by means of a lens aperture. Such optical or mechanical devices have obvious disadvantages and various methods have been proposed for controlling sensitivity electronically. None of the techniques developed to date have been free of problems, however. These include a shift of spectral response and a sacrifice of resolution due to modifications in the target structure.

SUMMARY OF THE INVENTION

It is the principal object of the present invention to provide a way for varying the sensitivity of a silicon diode array imaging device over a wide range without adversely affecting its operation and without unduly increasing its complexity.

In accordance with the present invention, each point on the target is scanned between successive readout scans at an intermediate time in the reading cycle in order to erase the integrated input information and to recharge the diode located opposite that point, leaving only the remainder of the scan period for integration prior to the next readout scan. This is preferably achieved by advancing the position of the electron beam in the vertical direction during horizontal retrace. This can be most directly accomplished by means of two identical vertical deflection ramps signals which are displaced in time, one being in effect during each horizontal scan time and the other during each horizontal retrace time. With this arrangement the integration time prior to each read scan can be varied from zero to one-half the scan period by varying the phase between the two vertical ramp signals. The beam current during the retrace scan should be substantially higher than during the read scan in order to compensate for the short time allowed for the retrace scan and to allow for the possibility that the target may have been completely discharged by the high illumination level which made sensitivity control necessary.

BRIEF DESCRIPTION OF THE DRAWINGS

The present invention will be best understood by reference to the following detailed description taken in connection with the accompanying drawings, in which.

DETAILED DESCRIPTION OF THE INVENTION

Figure 1:
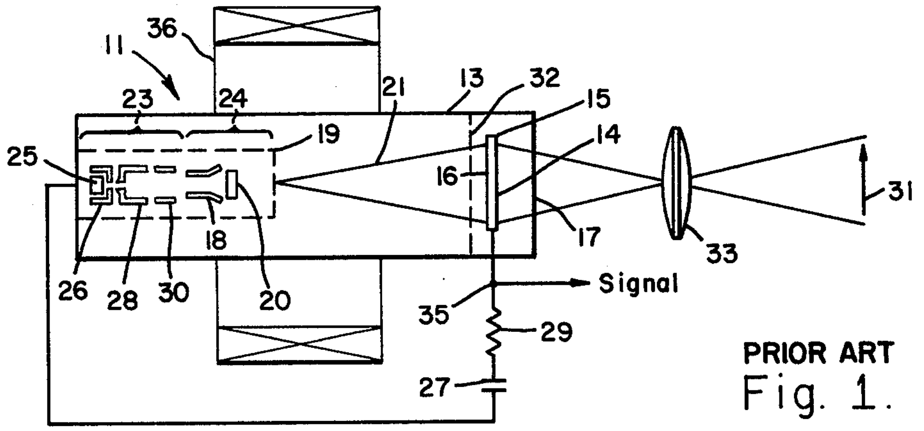
PRIOR ART Fig. 1.
FIG. 1 illustrates an imaging device of the type improved by the present invention.

Referring now to the figures, a vidicon camera tube incorporating a junction diode target is illustrated in FIG. 1. Principally, it includes within a sealed glass envelope 13 a target 15 near one end of the envelope next to a window 17 therein, and means 19 near the opposite end of the envelope for generating an electron beam 21 and for periodically scanning the diode-covered side 16 of the target therewith. The electron beam generating and scanning means 19 includes an electron gun assembly 23 and beam deflection devices 24. The electron gun includes a cathode 25 from which the electron beam is generated and whose potential determines the potential of the electron beam. Also forming part of the electron gun assembly is a control grid 26, shaping grid 28 and accelerator grid 30. Near the target 15 is a decelerator grid 32. The beam deflection devices 24 include vertical and horizontal deflection elements 18 and 20 which may operate either by electrostatic or electromagnetic principles to deflect the electron beam 21. The body of the target 15 is maintained at a positive potential relative to the electron beam 21 by a biasing means 27, shown as a battery, connected between the cathode 25 and the target 15 through a load resistor 29, so that the diodes in the target are reverse biased and receive an electric charge from the electron beam which scans them. The electron beam 21 is focused on the target 15 by means of a conventional magnetic focus coil 36 through which DC is passed. The focus coil 36 too could be replaced with an equivalent electrostatic lens.

Light from an image 31 is directed at the imagereceiving side 14 of the target 15 through the envelope window 17 by an optical system schematically indicated by the lens 33.

As photons from the image 31 strike the target side 14, electron-hole pairs are generated near the point of impact, and the holes of the pairs travel to the diode side 16 of the target, where they combine with the electric charge stored in the particular diode which they reach. In this manner the diode side of the target 15 loses its charge in a pattern corresponding to the image 31. Consequently, during the next scan of the electron beam 21, the respective diodes of the target receive an amount of charging current proportional to the amount of charge which they had lost. The resulting current fluctuation is detected in the biasing circuit at the point 35 as a voltage change and is used to produce a voltage-variable signal representative of the detected image.

Figure 2:
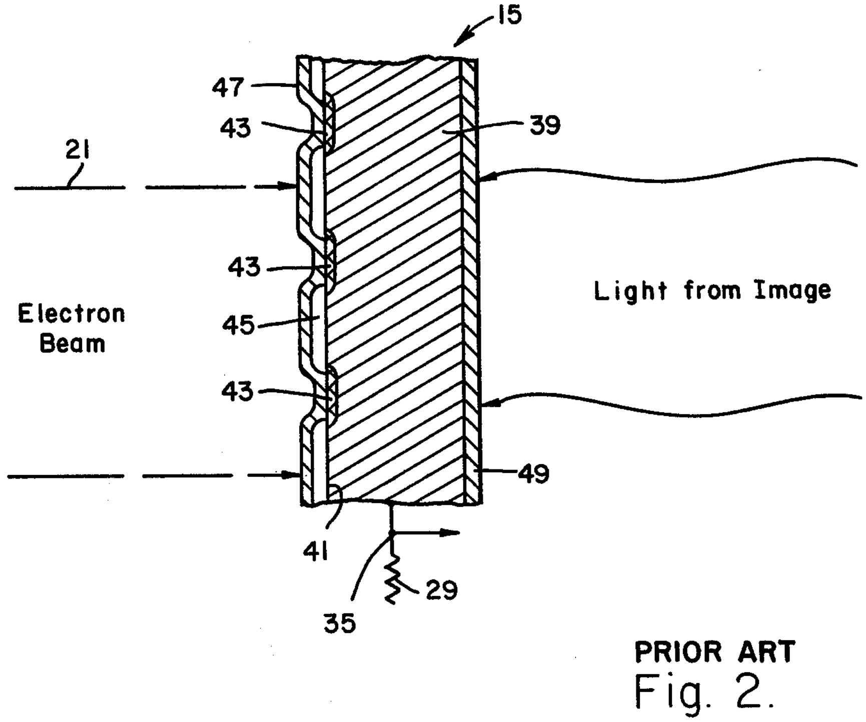
PRIOR ART Fig. 2.
FIG. 2 illustrates the diode junction array target used in the device of FIG. 1 and the manner in which impinging light is transformed into stored electric charge.

Referring to FIG. 2 for a fuller understanding of the phenomenon by which a light image is converted into a charge pattern in the junction diode type vidicon target, the junction diode vidicon target 15 illustrated therein includes a wafer substrate 39 having a scanned face 41 in which a large number of closely spaced, extremely small, P conductivity-type doped regions 43 have been formed. Covering the face 41 is an oxide layer 45 with openings therein, so as to expose each of the doped regions 43. Usually the entire scanned face 41, including both the doped regions 43 and the oxide layer 45, is covered by a "resistive sea" 47 whose function is to prevent excessive charge from accumulating upon the oxide layer 45. The opposite face of the target 15 is usually doped more heavily than the substrate 39 so as to have a conductivity greater than, but of the same type as, the substrate. This is shown in FIG. 2 by the N+ layer 49. The purpose of the layer 49 is to produce a field gradient whose effect is to encourage the migration of holes toward the diode regions 43 when the target 37 receives light from the image. Each of the P regions 43 forms a diode junction with the substrate 39 and, upon being scanned by the electron beam 21, accumulates an amount of charge determined by the target potential between the substrate 39 and the electron beam 21.

As explained previously, in a conventional vidicon the target is scanned periodically, usually thirty times per second. This is done by applying a periodically recurring ramp voltage to the horizontal deflection devices 28. The leading edge of the voltage ramp is relatively shallow so as to traverse the electron beam across the target at a relatively slow rate. The trailing edge is relatively steep so as to return the electron beam to its starting position quickly, in readiness for it to be scanned across the target again.

In the meantime, a voltage ramp is also applied to the vertical deflection elements 26 so as to progressively deflect the electron beam further and further down the target. In this way successive horizontal scans across the back of the target occur along lines which are progressively displaced in the vertical direction. Since the target is scanned horizontally along several hundred lines, the period of the vertical ramp will be much longer than that of the horizontal ramp. In order to keep the electron beam invisible while it is being retraced between successive scannings, a control pulse is applied to the control grid 26 of the cathode ray gun so as to blank out the cathode beam while it is being retraced. In this way each point of the target is scanned periodically, e.g., thirty times per second by the electron beam 21.

Scanning of the target 16 by the electron beam 21 serves two functions. First, the electron beam "primes" the diodes along its path so that each receives a predetermined amount of charge which is limited by the capacity of the diodes to store charge under the operating conditions dictated by the design of the vidicon. During the next 1/30 second, there will be removed from those diodes an amount of charge which is a function of the total amount of light which reached the target 15 opposite the diodes during that time period.

The second function of the electron beam 21 is to detect the amount of charge removed from each diode. It does so when it next scans a line of diodes and replenishes their lost charge. The amount of charge required to replenish the scanned diodes is reflected by the electron current drawn from the beam and is sensed as a signal at the point 35. The maximum light intensity detectable by vidicons operating on this principle is limited by the fact that every diode on the target 15 is capable of storing a predetermined maximum amount of electric charge and by the fact that the rate at which this charge is dissipated in response to impinging photons cannot be varied. Consequently, if the image projected upon any particular point of target 15 exceeds a predetermined brightness, the diodes opposite that point of the target will lose all of their charge before the end of their scan cycle. Consequently, in order to insure that this does not happen, a limit must be placed on the greatest permissible light intensity of the image 31 by optical or mechanical means.

In accordance with the present invention a way is provided for altering the sensitivity of a vidicon such as that illustrated in FIG. 1 electronically, so as to enable it to respond to images varying over a wide range of intensity without requiring that the image be attenuated and without altering in any way the structure of the target 15. Essentially this is accomplished by altering the manner in which the vidicon is operated and more particularly the way in which the electron beam 21 is scanned across its target 15. This will best be understood by referring to FIG. 3, in which a silicon diode array target 15 upon which an image is projected through a lens 33 is seen to be scanned by an electron beam 21 from an electron gun 16. For sake of clarity, the scanning apparatus has been omitted. Two successive horizontal scan lines 61 and 61' are also illustrated. Contrary to normal operation, in which the electron beam would be blanked while it is returned from the end of a particular horizontal scan line 61 to the beginning of the next such line 61', this is not the case with the present invention. Instead, the electron beam is made to go through an excursion between successive horizontal scannings 61 and 61' during which not only is it not turned off but, to the contrary, is intensified. Thus, after completing its horizontal scan 61 across the target 15, the electron beam 21 is deflected through a vertical excursion 63 to return along a retrace path 65 to the left side of the target as seen in FIG. 3 and to then execute a further vertical excursion 67, positioning it at the beginning of its next horizontal scan line 61'.

In keeping with a key feature of the invention, the horizontal retrace path 65 of the electron 21 occurs along a line which will be scanned a predetermined number of scan cycles after the particular line 61 which the retrace path 65 follows. Moreover, the number of horizontal scan cycles intervening between the particular horizontal scan 61 and the subsequent horizontal scan which will track along the path 65 can be made variable. To appreciate the significance of this, it is necessary to understand the new method of operation which the system illustrated in FIG. 3 brings about. By erasing the information stored in the diodes lying along the line 65 and recharging those diodes to their initial state when the electron beam 21 is retraced along the line 65, each of the diodes lying along that line is given only a fraction of the time elapsing between successive horizontal scans to lose its charge due to impinging light. Assuming, for example, that the total number of horizontal scan lines is 256 and that the horizontal scan 61 and its associated retrace 65 are so adjusted that the line 65 will be scanned from left to right 15 scan cycles after it had been erased, it will be seen that the time available to discharge the diodes lying along the track of the horizontal retrace line 65 is 15/256 times 1/30 second. The farther the horizontal scan 61 lags behind the horizontal retrace 65, the less attenuated will be the sensitivity of the diode target 15.

Figure 3:
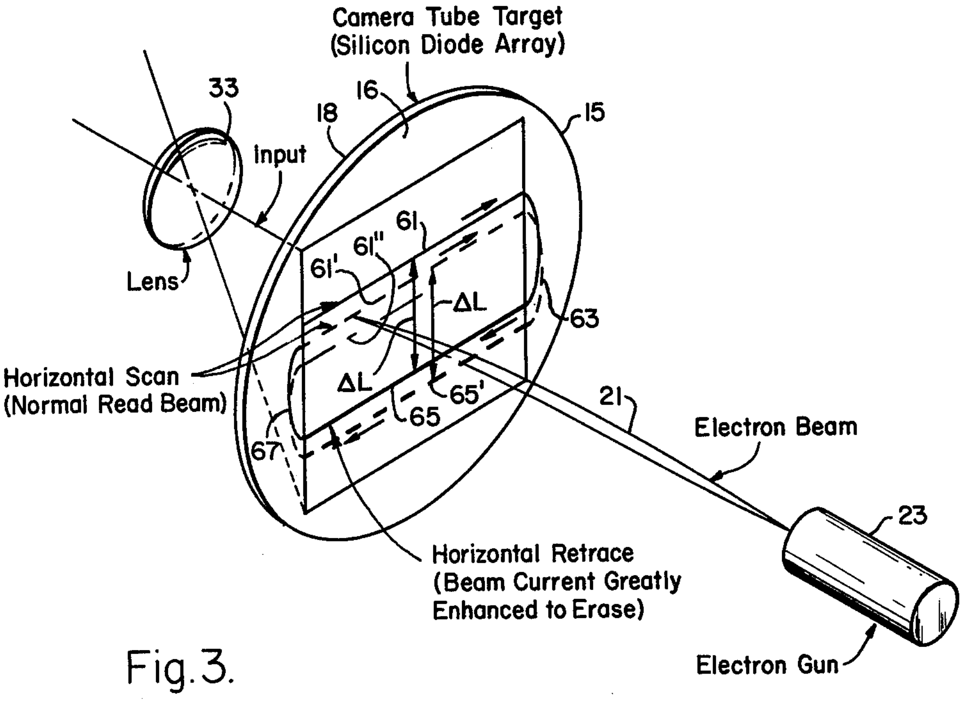
FIG. 3 illustrates the principle of the present invention by which the sensitivity of the device illustrated in FIG. 1 using the target shown in FIG. 2 may be adjusted.

In order to traverse the electron beam 21 through its desired path as illustrated in FIG. 3 by means of the vertical and horizontal deflection elements 18 and 20, there must be periodically applied to the horizontal deflection elements 20 in succession a pair of horizontal deflection control signals, the first of which causes the electron beam 21 to traverse the target from one end to the other so as to read it and the second of which causes the electron beam to retrace across the target so as to erase a line of it. Similarly, the vertical deflection elements 18 must receive a pair of vertical deflection control signals, the first of which coincides with the application of the horizontal scan control signal and the second of which coincides with the application of the horizontal retrace control signal.

Figure 4:
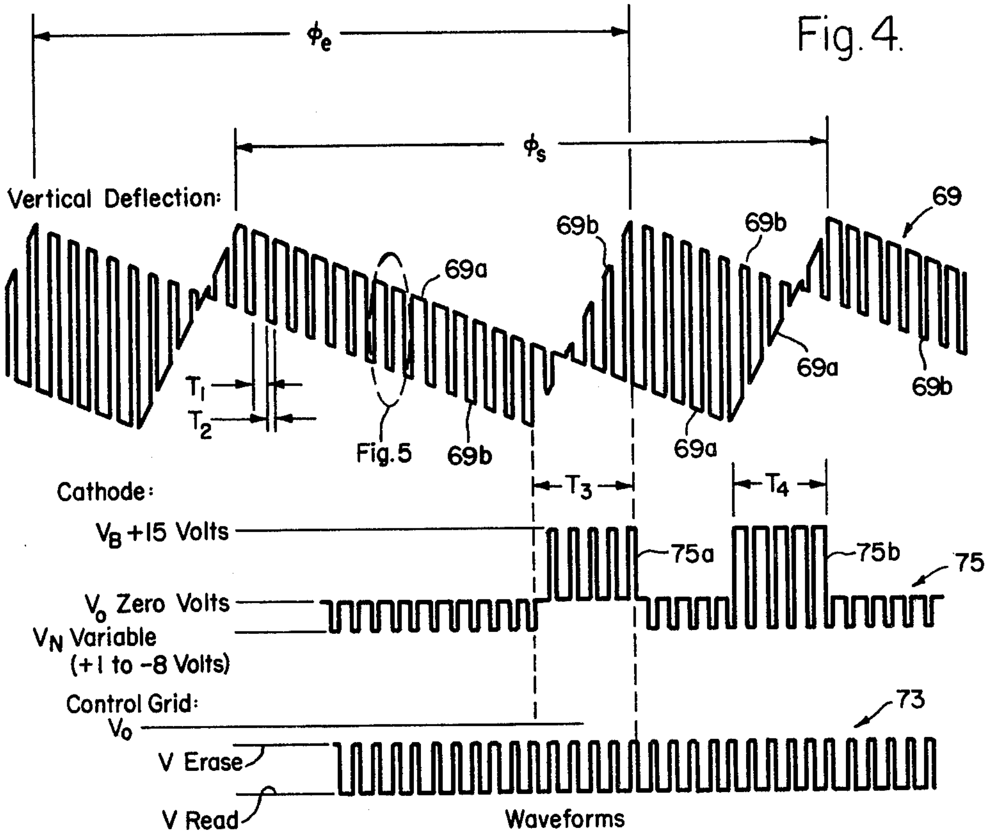
FIG. 4 comprises a series of waveform diagrams depicting the signals applied to various elements of the device of FIG. 1 in accordance with the present invention.
Figure 5:
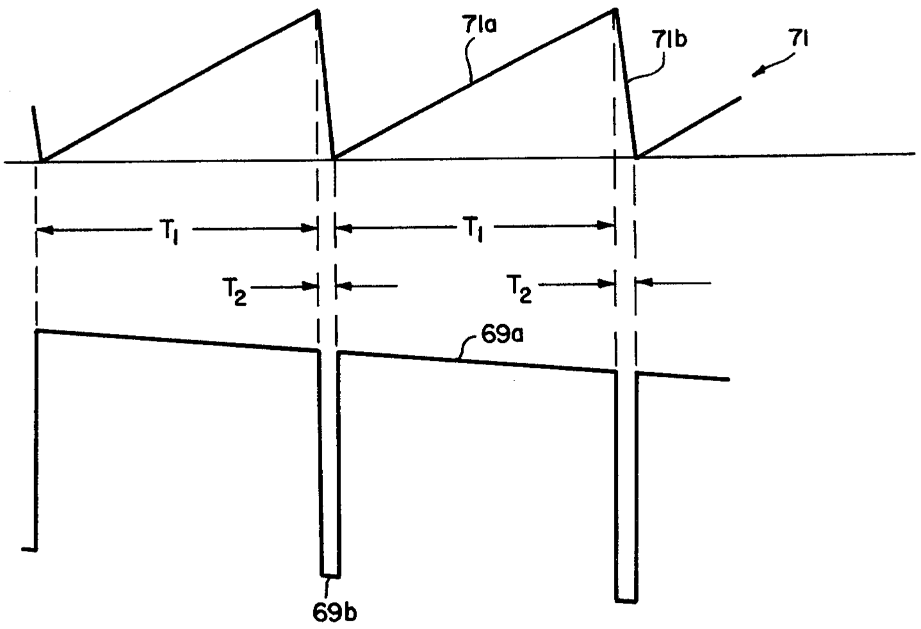
FIG. 5 depicts certain ones of the waveforms illustrated in FIG. 4 enlarged to show the relationship between the signals applied to the horizontal and vertical deflection elements of the device of FIG. 1.

FIGS. 4 and 5 illustrate a preferred set of waveforms representing these required control signals. Appearing at the top of FIG. 4 is the vertical deflection signal 69, alternating between limits **69*a* and 69*b*. Shown in FIG. 5 as the waveform 71 is a voltage ramp having periodically recurring relatively shallow leading edges 71*a* and relatively steep trailing edges 71*b*. The leading edges 71*a* serve as the horizontal scan control voltage to deflect the beam during scan period $T_1$ while the trailing edges 71*b* perform the function of retracing the horizontal beam 21 during the erase operation which occurs during the time period $T_2$. As also seen in FIG. 5, the vertical deflection control voltage 69 is at its upper level 69*a* during the read interval $T_1$ and drops to its lower level 69*b* during the erase interval $T_2$. The differential through which the value of the vertical deflection control voltage 69 changes when it alternates between its limits 69*a* and 69*b*, i.e., between the erase and read intervals, determines the time lag represented in FIG. 3 by the line marked $\Delta L$ which elapses between the time when a given line on the target is erased and fully charged and when it is next read by the beam 21** during its scanning operation.

In accordance with a particular feature of the present invention, the vertical deflection control voltage 69 can be readily generated from two identical periodically recurring voltage ramps whose outline is delineated by the voltage limits **69*a* and 69*b***, respectively.

Figure 6:
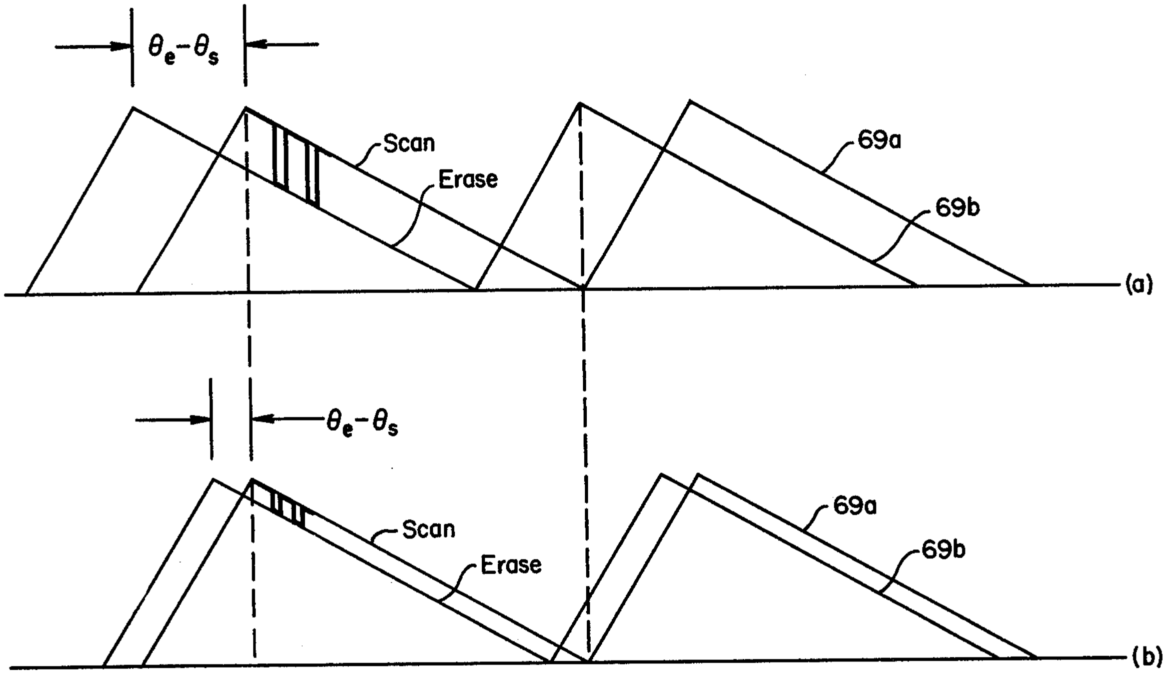
FIG. 6 depicts two identical voltage ramps phase shifted relative to one another which are applied to the vertical deflection elements of the device of FIG. 1 in accordance with the present invention to show how the amount of phase shift between the two voltage ramps determines the attenuation of the impinging image and, hence, the sensitivity of the device.

The first voltage ramp **69*a* cycles through a period $\phi_s$, and the second voltage ramp 69*b* through a period $\phi_e$. The waveform 69 is derived from the two identical ramp voltages 69*a* and 69*b* by alternately switching them to the point where the composite waveform 69 is desired, i.e., to the vertical deflection element. Moreover, by varying the phase of one of the waveforms 69*a* and 69*b* relative to the other, the magnitude of the excursion at any given instant between the two voltage levels 69*a* and 69*b* can be readily altered. This is best seen in FIG. 6** in which a first set of waveforms (*a*) illustrates the two identical ramp waveforms **69*a* and 69*b*** with a relatively large phase difference $\theta_e - \theta_s$ between them and a second set of waveforms (*b*) in which the phase difference $\theta_e - \theta_s$ between the same pair of waveforms **69*a* and 69*b* is seen to be about one-third that. It can be seen that, with the reduction in phase difference between the waveforms 69*a* and 69*b*, there is a correspondingly smaller voltage drop at any given instant when one switches from one of the waveforms 69*a*, 69*b*** to the other.

While the electron beam 21 is thus deflected along its desired path of FIG. 3 by the composite vertical deflection signal 69 and the horizontal deflection signal 71, its current level is controlled by a control signal 73 applied to the control grid 26 of the electron gun 23. During the time periods $T_1$ when the electron beam scans left to right as seen in FIG. 3, the control voltage 73 is at a negative voltage level $V_{read}$ and during the time periods $T_2$ when the electron beam 21 is used to erase, the control voltage 73 is at a less negative voltage $V_{erase}$ causing its current level to be raised.

Blanking of the electron beam 21 is still required to avoid obliterating the information being stored in the target. This is controlled by the waveform 75. Blanking of the beam is required during two periods $T_3$ and $T_4$. The period $T_3$ begins when the electron beam 21 has been vertically deflected during its erase mode to the bottom of the target and begins to be switched in steps toward the top of the target, still leading the beam in its read mode. During the time $T_3$, while this happens, the electron beam 21 must be blanked during the short time periods $T_2$ which occur within the time period $T_3$. This is accomplished by the short blanking pulses 75*a* occurring within the time period $T_3$ during which the waveform 75 goes from $V_0$ to positive level $V_B$. The second time period during which the electron beam 21 must be blanked is $T_4$. It begins when the electron beam has been deflected to the bottom of the target while in its read mode and commences to traverse the target vertically upward toward its top. Blanking pulses must therefore be applied to the electron gun during the read intervals $T_1$ which occur during the period $T_4$. These are represented by the pulses 75*b* in FIG. 4.

Figure 7:
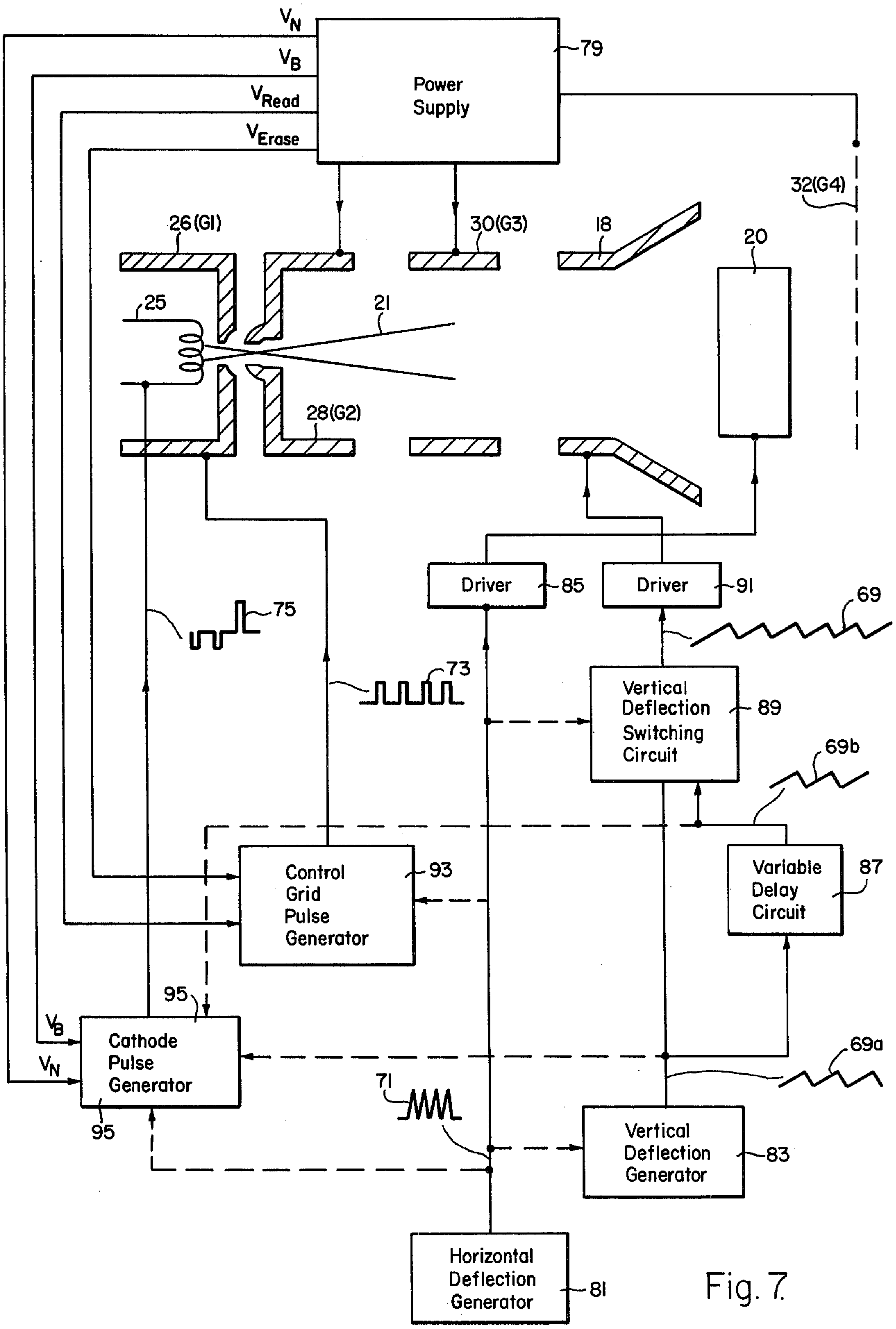
FIG. 7 is a block diagram illustrating in greater detail those portions of the system of FIG. 1 central to the present invention.

A system for generating the control signals required to practice the present invention in the manner illustrated in FIG. 3 is depicted in FIG. 7. Its output signals are shown applied to the various electrodes of the vidicon 11 previously illustrated in FIG. 1. The system works off a power supply 79 which generates the various bias voltages applied to the cathode 25 and to the electrodes 26 (G1), 28 (G2), 30 (G3) and 32 (G4). For sake of simplicity the focus coil 36, previously mentioned with reference to FIG. 1, and its connection to the power supply 79 has been omitted from FIG. 7. The basic waveform generated by the system of FIG. 7 is the horizontal deflection ramp voltage 71 produced by the horizontal deflection generator 81. For this purpose the generator 81 should include an oscillator and a ramp voltage generator both of which may be of conventional design. Assuming a conventional operating frequency, the oscillator will operate at a frequency of 15,750 hertz. The resulting ramp voltage 71, which may be assumed to have the same rise and fall times $T_1$ and $T_2$ as in conventional vidicons, is applied through a driver 85 to the horizontal deflection device 20. Deflection of the electron beam 21 may be either electrostatic or electromagnetic. For sake of a concrete illustration, electrostatic deflection is illustrated in FIGS. 1 and 7. Consequently, the deflection elements 18 and 20 are shown as electrostatic deflection plates.

The horizontal ramp voltage 71 is also applied to a vertical deflection generator 83, whose function is to frequency divide that voltage by 525/2 and to produce a voltage ramp 69*a* at that divided-down frequency, which is 60 hertz. The frequency division and the voltage generation may be accomplished by standard countdown and ramp generating circuitry. A second vertical voltage ramp 69*b*, which is variably phase shifted relative to the voltage ramp 69*a* is generated by applying that voltage ramp to a variable delay circuit 87. The resulting phase-shifted vertical voltage ramp 69*b*, as well as the first vertical voltage ramp 69*a* is applied to a vertical deflection switching circuit 89, which is operative to alternately apply the two voltages 69*a* and 69*b* to a driver 91 whose output is connected to the vertical deflection plates 18.

As mentioned previously with reference to FIGS. 4 and 5, the alternate switching of voltages 69*a* and 69*b* must be in synchronism with the horizontal deflection voltage 71 and, for this reason, that voltage is applied as an input to the vertical deflection switching circuit 89. Also switched in synchronism with the horizontal control voltage 71 is the voltage 75 on the cathode 25. That voltage, it will be recalled with reference to FIG. 4, is switched between the levels $V_B$, $V_o$, and $V_N$, so as to intermittently blank the beam during periods $T_3$ and $T_4$ and to step up its energy level during the retrace/erase operation during periods $T_2$. Toward this end a pair of supply voltages $V_B$ and $V_N$ are applied from the power supply 79 to a cathode pulse generator 95 which is operative to switch one or the other of the voltages $V_N$ and $V_B$ under the control of, and in synchronism with, the horizontal voltage ramp 71 and the vertical voltage ramps 69*a* and 69*b* to the cathode 25. Thus, during time periods $T_1$, the output of pulse generator 95 is kept at the intermediate voltage level $V_o$, and during time periods $T_2$ it is switched to one or the other of the voltage levels $V_N$ and $V_B$. Whether it is $V_N$ or $V_B$ to which it is switched during a given time period $T_2$ is controlled by the application of the voltage ramps 69*a* and 69*b* to the pulse generator 95. Thus, during the time periods $T_3$, when the voltage ramp 69*b* is on its ascendancy, the cathode control signal 75 from the pulse generator 95 is switched to voltage level $V_B$ during the horizontal retrace time periods $T_2$. Similarly during time periods $T_4$, when the voltage ramp 69*a* has a positive slope, the cathode control signal 75 is switched to voltage level $V_N$ during time periods $T_2$.

Switched next to the cathode 25 is a control electrode 26 whose function is to control the focusing of the electron beam 21, so as to enhance the ability of the electron beam to pass through the limiting aperture which is central to the control electrode 28. For this purpose the control voltage applied to the control grid 26 is switched between two levels $V_{erase}$ and $V_{read}$ which are derived from the power supply 79 and are switched alternately in the manner illustrated in FIG. 4 in synchronism with and under the control of the horizontal voltage ramp 71 by means of the control grid pulse generator 93. When the control grid 26 is at the potential $V_{read}$, during time periods $T_1$, it will cause the electron beam 21 to be focused before it reaches the aperture electrode 28 so that, by the time the beam reaches that electrode, it will have partially diverged and will therefore be partially blocked by that aperture. On the other hand, when the control electrode 26 is switched to the $V_{erase}$ potential, which occurs during the retrace-erase times $T_2$, the electron beam 21 will be focused at the aperture grid 28 and a much larger proportion of the beam will be transmitted therethrough. Moreover, during the time periods $T_2$, when the electrode 28 is at the potential $V_{erase}$, the cathode 25 is at the potential $V_N$ (except when it is blanked). Consequently, the current level of the electron beam 21 is greatly stepped up during the retrace-erase time periods $T_2$.

Figure 8:
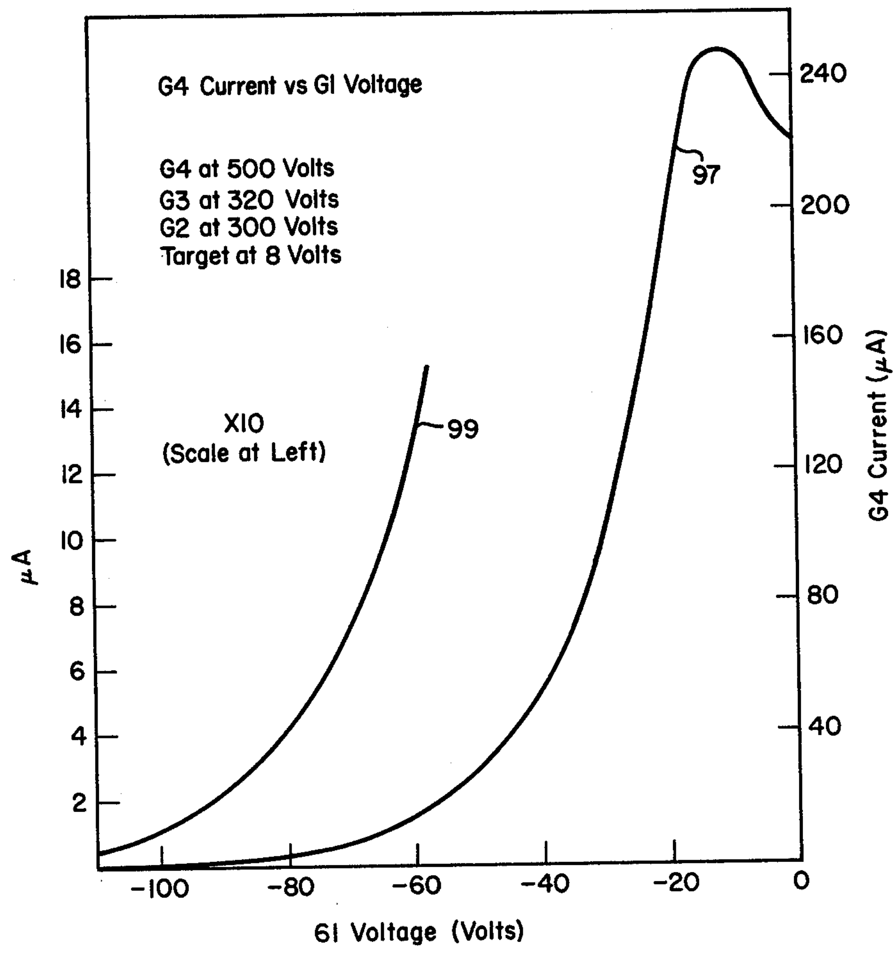
FIG. 8 is a graph of electron beam current versus grid control voltage found desirable for practicing the present invention.

The electron beam current required during retrace-erase time periods $T_2$ is higher than what is normally required in silicon diode array vidicons. A plot 97 of the electron beam current as detected at the decelerator grid 32, versus the control voltage on the control grid 26 appears in FIG. 8 in a vidicon having the electrode design illustrated in FIG. 7 and found satisfactory for practicing the present invention. The voltages at which the control grids 26, 28, 30 and 32 were maintained for this measurement are indicated on FIG. 8, with the electrodes being respectively identified as G1, G2, G3 and G4. Also shown in FIG. 8 is the plot 99 which is the same as the plot 97 but magnified by a factor of 10 in order to more clearly indicate the electron beam current at the higher control grid voltages. Peak electron beam current is seen to occur when the control grid voltage is at about −15 volts. A set of suitable operating voltages for the vidicon in accordance with the present invention has been found to be 420 volts on G4, 320 volts on G3, 240 volts on G2, −70 volts on G1 during read, and −24 volts on G1 during erase.

Experiments with the vidicon incorporating the present invention have shown that sensitivity control can be achieved over a 256:1 range of illumination. It has also been found that, in order to operate toward the higher end of the illumination range, i.e., maximum attenuation of sensitivity, it is necessary to lower the voltage on the cathode 25 from a slightly positive value at full sensitivity to approximately −8 volts at minimum sensitivity, taking the cathode potential during readout as a zero reference voltage. It has also been found that the target voltage needs to be raised from a normal value of approximately 7 volts at full sensitivity to approximately 14 volts at minimum sensitivity. It is possible to leave the target voltage at its higher level over the entire sensitivity range of the vidicon. However, picture quality is adversely affected if the target voltage is unnecessarily high.

What is claimed is:

1. A method of electronically selecting the sensitivity of an imaging device having a silicon diode array target comprising steps of:

(a) exposing the front of said target to an image;
(b) periodically scanning successive lines on the back of said target with an erasing electron beam;
(c) periodically scanning each of said successive target lines with a reading electron beam a uniform time after it has been scanned by said erasing electron beam; and
(d) selecting the time lag of said scanning electron beam relative to said erasing electron beam to attain a desired sensitivity for said imaging device.

2. The method of claim 1 characterized further in that said electron beam is deflected across the back of said target in a first direction for erasing each said line and in the opposite direction across the back of said target for reading each said line.

3. The method of claim 2 characterized further in that said electron beam is maintained at a given current level while it is deflected in said first direction and at a significantly lower current level while it is deflected in said opposite direction.

4. A method of electronically varying the sensitivity of an imaging device having a semiconductor target with an array of diodes covering the rear surface of said target comprising the steps of:

(a) exposing the front of said target to an image;
(b) periodically scanning successive lines across the back of said target with a reading electron beam at a given current level;
(c) retracing said electron beam at an elevated current level across the back of said target during periods intervening between successive ones of said scannings, the retracing that follows each scanning occurring along a line to be swept a uniform number of scannings thereafter; and
(d) altering said uniform number to adjust the sensitivity of said imaging device.

5. An imaging device comprising in combination:

(a) a semiconductor target disk having a front surface for receiving a projected image and a rear surface covered with an array of diodes;
(b) means for projecting a beam of electrons at said target rear surface; and
(c) means for periodically read-scanning said beam of electrons along successive lines forming a field on said target rear surface so as to read charges stored in diodes traversed by said beam and for periodically erase-scanning said beam across said lines so as to recharge said diodes prior to next reading them, each erase-scanning of a line in a given field preceding by a uniform time interval the next read-scanning of said line in the same field.

6. An imaging device comprising in combination:

(a) a semiconductor target disk having a front surface for receiving a projected image and a rear surface covered with an array of diodes;
(b) means for projecting a beam of electrons at said target rear surface;
(c) means for periodically read-scanning said beam of electrons along successive lines on said target rear surface so as to read charges stored in diodes traversed by said beam and for periodically erase-scanning said beam across said lines so as to recharge said diodes prior to next reading them, each erase-scanning of a line preceding by a unform time interval the next read-scanning of said line: and
(d) means for adjusting said uniform time interval to alter the sensitivity of said imaging device.

7. An imaging device in accordance with claim 6 characterized further by means for maintaining the current level of said electron beam at a significantly higher level during said erase-scannings than during said read-scannings.

8. An imaging device in accordance with claim 7 characterized further in that said means for scanning includes:

(1) vertical and horizontal deflection elements;
(2) means for periodically applying in succession a scan control signal and a retrace control signal to said horizontal deflection elements; and
(3) means for periodically applying a vertical deflection signal to said vertical deflection elements in synchronism with said scan and retrace control signals, said vertical control signal alternating between significantly different values during the application of successive scan control and retrace control signals to said horizontal deflection elements.

9. An imaging device in accordance with claim 8 characterized further in that said means for applying a vertical deflection signal includes:

(1) means for generating two identical periodically recurring ramp signals;
(2) means for alternately applying respective ones of said ramp signals to said vertical deflection elements; and
(3) means for varying the phase of one of said ramp signals relative to the other.

10. An imaging device comprising in combination:

(a) an evacuated envelope having a radiation transmissive window;
(b) a charge storing target comprised of a silicon disk having a front surface facing said window and a back surface containing an array of junction diodes;

(c) means facing said back surface for generating a beam of electrons;

(d) means for scanning said beam of electrons along successive lines across the back surface of said disk at a given current level so as to read charges stored in diodes traversed by said beam;

(e) means for retracing said electron beam during periods intervening between successive ones said scannings so as to charge diodes in the path of said retraced beam, the scanning of each line by said beam lagging the charging of that line by the retrace beam by a predetermined number of scanning intervals;

(f) means for maintaining the current level of said electron beam higher during said retracings than during said scannings; and (g) means for varying the number of scanning intervals by which the reading of a given target line lags the charging of that line.

11. A method of operating an imaging device having a semiconductor target with an array of diodes covering its rear surface, an electron beam generator aimed at said diodes, vertical electron beam deflecting elements and horizontal beam deflecting elements comprising the steps of:

(a) applying a periodically recurring horizontal deflection voltage ramp having a trailing edge which is steep relative to its leading edge to said horizontal beam deflecting elements to alternately scan and retrace said electron beam across the rear surface of said target;

(b) alternately applying two identical, periodically recurring vertical deflection voltage ramps to said vertical beam deflecting elements so that one of said vertical deflection voltage ramps coincides with the leading edge of said horizontal deflection voltage ramp and the other of said vertical deflection voltage ramps coincides with the trailing edge of said horizontal deflection voltage ramp;

(c) varying the phase of one of said vertical deflection voltage ramps relative to the other; and (d) applying a control signal to said electron beam generator in synchronism with said horizontal voltage ramp so as to raise the current level of said electron beam during the trailing edges of said horizontal voltage ramp above its current level during the leading edges of said horizontal voltage ramp.

* * * * *